United States Patent [19]
Liskow

[11] Patent Number: 5,099,585
[45] Date of Patent: Mar. 31, 1992

[54] IN-PROCESS MACHINE GAGE

[75] Inventor: Karl J. Liskow, Ypsilanti, Mich.

[73] Assignee: Control Gaging, Inc., Ann Arbor, Mich.

[21] Appl. No.: 656,714

[22] Filed: Feb. 19, 1991

[51] Int. Cl.$^5$ .................................................. G01B 5/00
[52] U.S. Cl. ........................................ 33/783; 33/806; 33/555.1; 33/555.2; 33/797
[58] Field of Search ............... 33/783, 800, 803, 804, 33/806, 807, 808, 542, 543, 549, 550, 551, 555.1, 555.2, 555.3, 792, 556, 797, 798

[56] References Cited

U.S. PATENT DOCUMENTS

| | | | |
|---|---|---|---|
| 2,018,384 | 10/1935 | Schoof | 33/803 |
| 3,470,617 | 10/1969 | Wilson | 33/797 |
| 3,688,411 | 9/1972 | Asano et al. | 33/783 |
| 3,846,916 | 11/1974 | Moriya et al. | 33/555.1 |
| 4,614,038 | 9/1986 | Fivaz et al. | 33/555.1 |
| 4,625,413 | 12/1986 | Possati et al. | 33/551 |
| 4,651,430 | 3/1987 | Vasku | 33/550 |
| 4,881,324 | 11/1989 | Khinchuk | 33/783 |

FOREIGN PATENT DOCUMENTS

| | | | |
|---|---|---|---|
| 0877500 | 5/1953 | Fed. Rep. of Germany | 33/803 |
| 1548221 | 7/1970 | Fed. Rep. of Germany | 33/783 |
| 0485302 | 9/1975 | U.S.S.R. | 33/555.1 |

Primary Examiner—William A. Cuchlinski, Jr.
Assistant Examiner—Alvin Wirthlin
Attorney, Agent, or Firm—Harness, Dickey & Pierce

[57] ABSTRACT

An in-process gage is disclosed utilizing a four bar linkage system having a floating bar in the form of a bellcrank with an active feeler connected to the bellcrank and engageable with the workpiece surface. A fixed feeler is attached directly to the gage body. Movement of the active feeler to stay in contact with the workpiece surface as it is machined results in motion of the bellcrank relative to the gage body. This motion is transferred to an electronic position sensing transducer producing an electrical signal representing the workpiece size used to control the machining process. The four bar linkage system provides for precise rotation of the active feeler with virtually zero backlash enabling a gage to be constructed that is relatively thin to fit into narrow working envelopes.

25 Claims, 3 Drawing Sheets

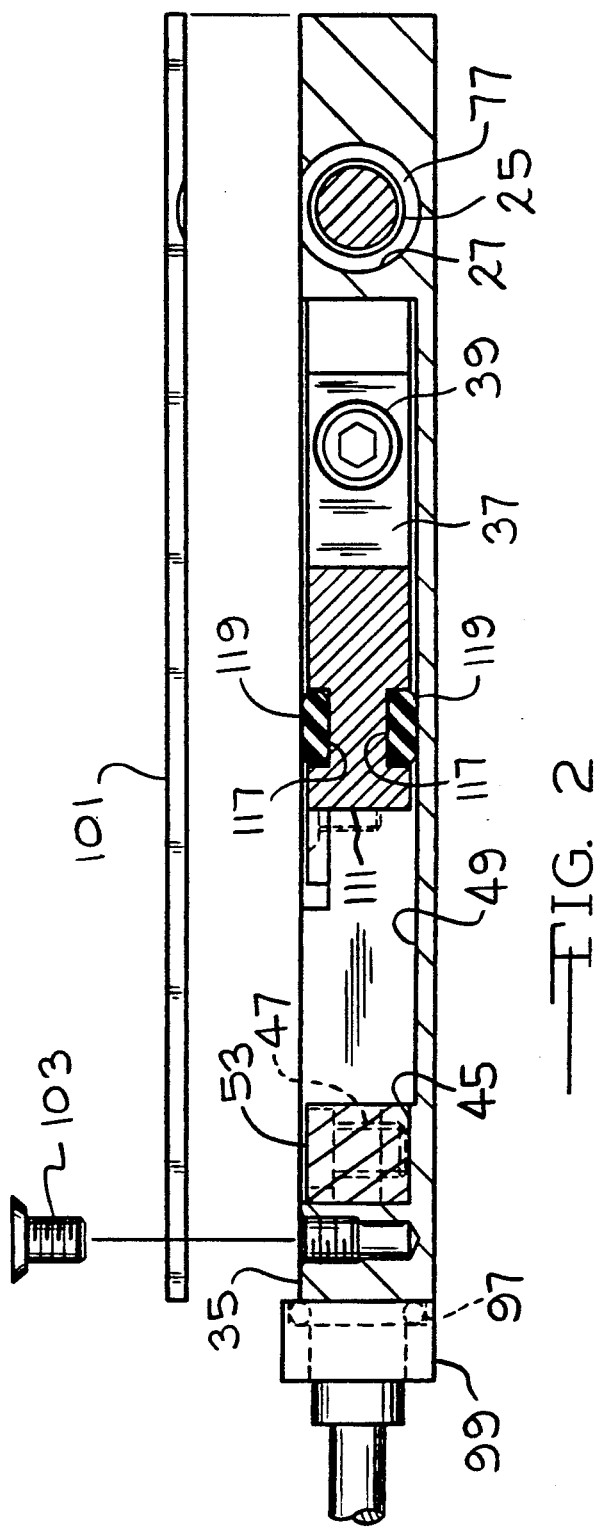

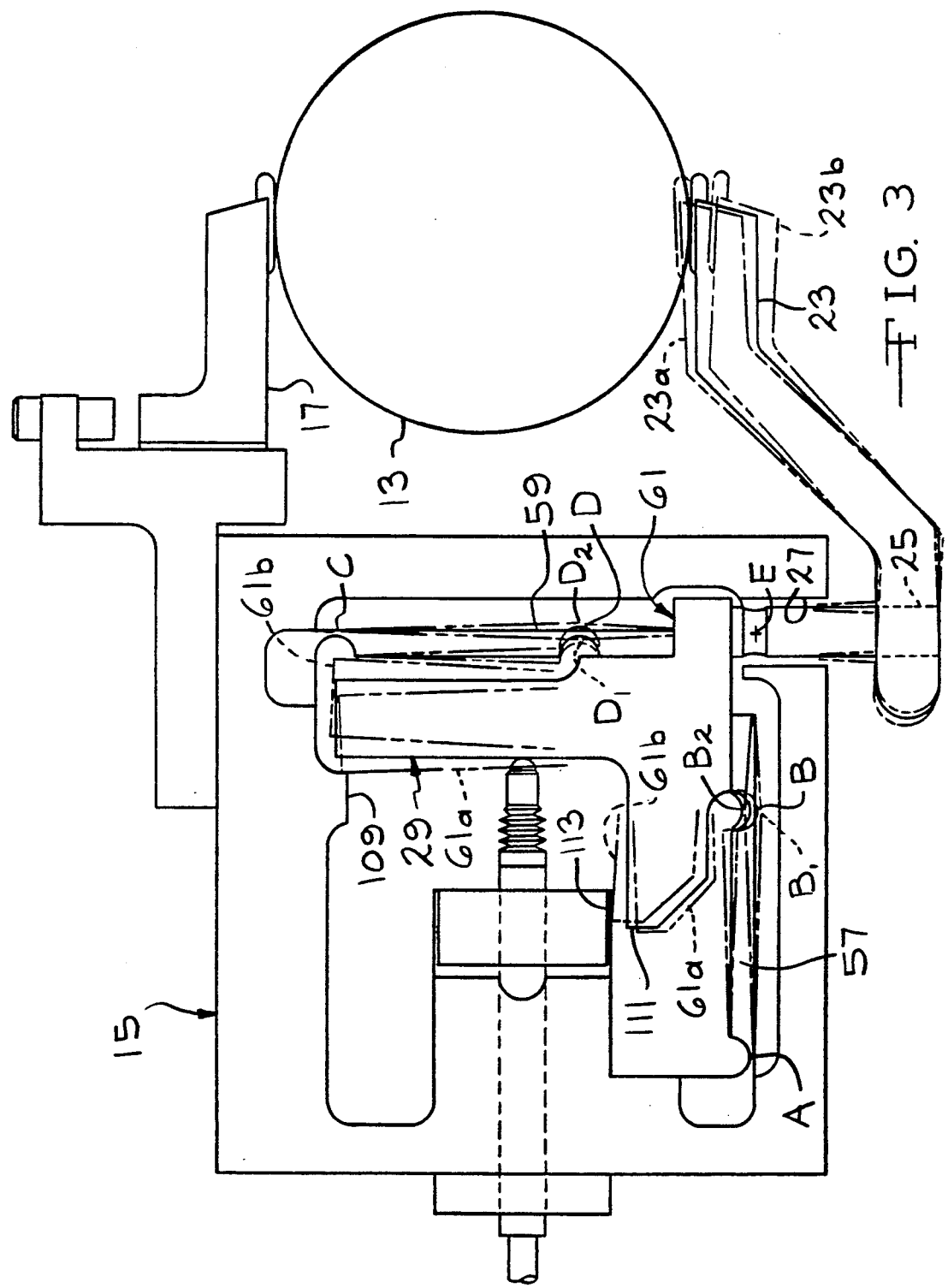

IN-PROCESS MACHINE GAGE

BACKGROUND AND SUMMARY OF THE INVENTION

The present invention relates to an in-process gage and in particular to a gage employing flexible linkages supporting a bellcrank to transfer workpiece size information to the electronic gaging transducer enabling the workpiece size information to be used to control the machining process.

High precision machining operations, such as the grinding of the crank pin journals of a crankshaft, is accomplished with an in-process gaging system in which the part size is measured during the grinding process. Information regarding the part size received from the gage is used to control the grinding process. Due to the high precision required of the grinding operation, the gage must also be of high precision.

When precision grinding the crank pin journals of a crankshaft, the small clearance between the throws and the counter weights on opposite sides of the shaft from the journals requires a thin gage to fit into this extremely narrow operating envelope. The moving parts of the gage, which must fit within a sealed case, must be narrower still. To develop a gage head which fits into extremely small spaces, it is generally not possible to use a pivot shaft with preloaded anti-friction bearings as has been done in the prior art for larger precision gages.

It is an object of the present invention to provide a gage for in-processing measuring of a workpiece having a narrow or thin gage head to fit into small spaces.

The gage head of the present invention utilizes a four bar linkage system in which the floating bar of the linkage is in the form of a bellcrank having one arm extending through the gage casing. An active feeler is coupled to the bellcrank arm and engages the workpiece surface. A fixed feeler is attached directly to the body of the gage head. Movement of the active feeler to stay in contact with the workpiece surface results in motion of the bellcrank relative to the gage body. This relative motion is transferred to an electronic position sensing transducer, producing an electrical signal related to the workpiece size that is used in controlling the grinding process.

The bellcrank pivot provides precise rotation of the active feeler with virtually zero back lash. This is necessary for a high precision gage. The actual center of rotation of the bellcrank is located near the edge of the gage casing. By being so situated, the casing is easily sealed where the bellcrank passes through the casing in spite of the extremely limited clearance provided in a gage of small size.

Further objects, features and advantages of the invention will become apparent from a consideration of the following description and the appended claims when taken in conjunction with the accompanying claims.

BRIEF DESCRIPTION OF THE DRAWINGS

FIG. 2 is a cross sectional view of the gage as seen from substantially the line 2—2 of FIG. 1; and FIG. 3 is a schematic view of the four bar linkage pivot system for the bellcrank showing the range of motion of the linkage components.

DETAILED DESCRIPTION OF THE INVENTION

Figure 1:
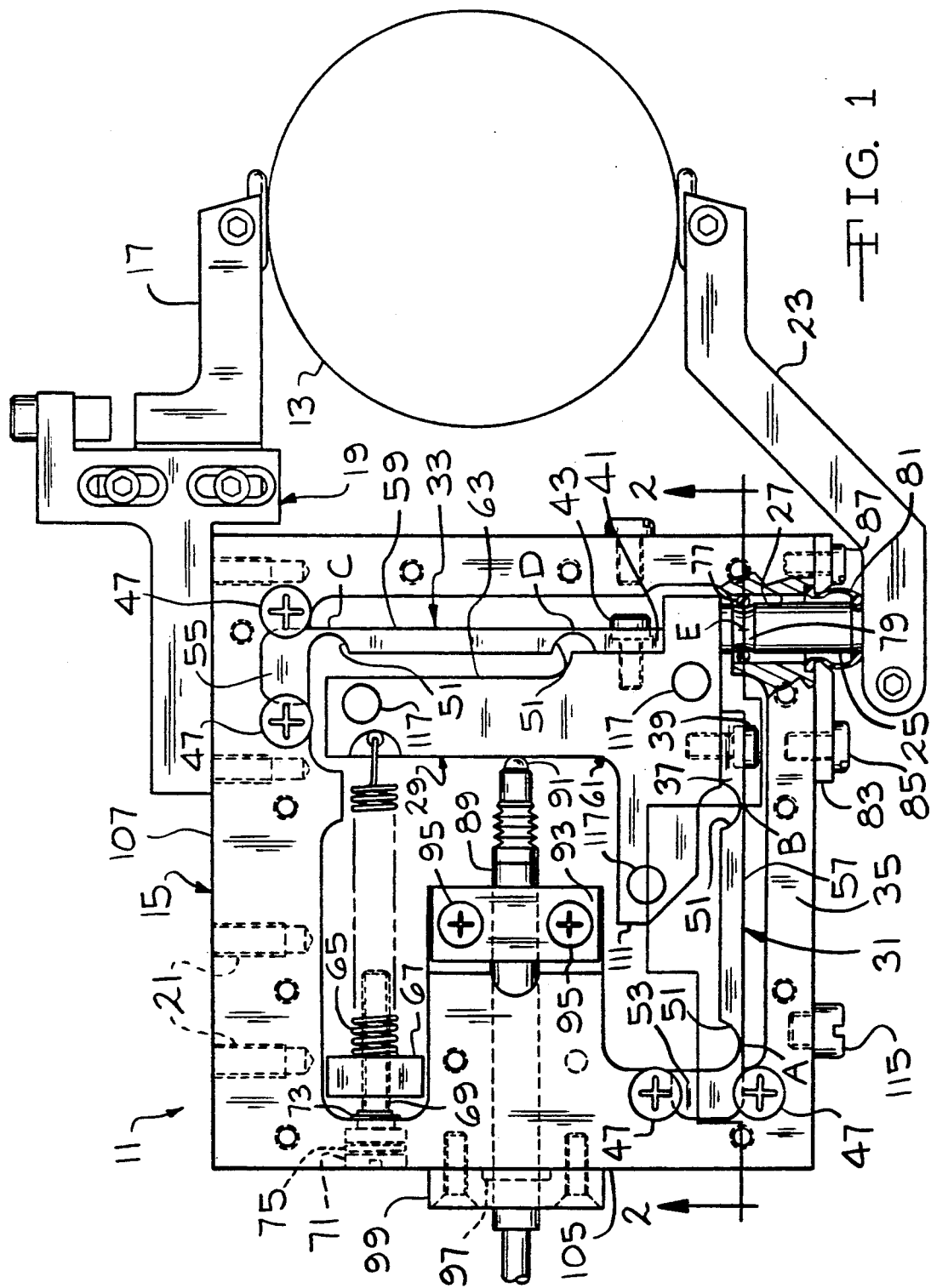
FIG. 1 is a plan view of the gage of the present invention with the cover removed to illustrate the internal components of the gage.

The gage of the present invention is shown in FIG. 1 and designated generally at 11. Gage 11 is shown in relation to a workpiece 13, the diameter of which is being measured by the gage in a grinding operation. Gage 11 includes a gage head body or case 15 to which is mounted the fixed feeler 17. Fixed feeler 17 is mounted to the body 15 through adjustable coupling 19. Body 15 is mounted to an associated grinder workpiece support (not shown) through mounting holes 21 in a manner than enables the gage head body 15 to float relative to the support so as to maintain contact between the fixed feeler 17 and the surface of workpiece 13 as the workpiece surface is ground.

The active feeler 23 is coupled to mounting post 25 extending through passage 27 in the gage head body 15. The mounting post 25 is one lever arm of bellcrank 29. Bellcrank 29 is mounted in the gage head 15 by a pair of cantilevered beams 31 and 33 extending from the side wall 35 of body 15. The cantilever beams 31 and 33 extend from the side wall 35 in directions that are normal to one another when in the nominal position shown in FIG. 1. The extending end 37 of beam 31 is rigidly coupled to bellcrank 29 by screw 39 while the extending end 41 of beam 33 is rigidly coupled to the bellcrank by screw 43.

Each of the beams 31 and 33 are mounted to the side wall 35 by screws 47 and seated firmly against the machined surface 45 in the side wall 35. (See FIG. 2) Surface 45 is parallel to the bottom interior surface 49 of the gage head body so as to ensure that the beams are parallel to body interior surface 49.

Each of the beams 31 and 33 include two reduced cross sectional areas 51 forming a pair of fulcra in each beam. The fulcra form pivot points A and B in beam 31 and pivot points C and D in beam 33. The pivot points A, B, C and D define a four bar linkage system. The four bar linkage consists of a ground bar formed by the body 15 and the mounting portions 53 and 55 of the beams 31 and 33 respectively which are rigidly coupled to the body 15. The center portion of beam 31 between pivot points A and B forms a first pivot bar 57 while the center portion of beam 33 between pivots C and D forms a second pivot bar 59. The pivot bars 57 and 59 rotate about pivot points A and C respectively. The bellcrank 29 along with the active feeler 23 and the extended ends 37 and 41 of the beams which are rigidly mounted to the bellcrank form a floating bar 61 of the four bar linkage system. Bar 61 is floating in the sense that it is coupled to the first and second pivot bars 57 and 59 at pivot points B and D which rotate about pivot points A and C respectively such that the bar 61 moves or floats within the gage body 15.

The floating bar 61 of the four bar linkage system will have an instantaneous center of rotation at the intersection of the line defined by pivot points A and B and the line defined by pivot points C and D. The instantaneous center of rotation is identified as point E. In the nominal position shown in FIG. 1 without any deflection in beams 31 and 33, point E is located along the center line of passage 27 through the casing side wall. The bellcrank 29 and active feeler arm 23 rotate generally about the point E as the surface of workpiece 13 is machined and the active feeler 23 moves to maintain contact with that surface.

Bellcrank 29 includes three lever arms extending from the pivot point E, the mounting bar 25 sensing arm 63 and the stop arm 111. A load applied to one arm of the bellcrank causes rotation of the bellcrank about the pivot point E, resulting in angular movement of the other arms. A coil tension spring 65 is coupled to the sensing arm 63 and the gage head body 15 to bias the bellcrank 29 in a counterclockwise direction as viewed in FIG. 1. This results in a biasing of the active feeler 23 toward the surface of workpiece 13 such that as the surface is machined, the feeler is urged to maintain contact with the surface with a predetermined contact pressure. The spring anchor 67 is linearly positionable on the shaft of adjustment screw 69. Head 71 of the adjustment screw is accessible from the exterior of gage head body 15. By rotating screw 69, the spring anchor 67 is moved along the length of the screw shaft, adjusting the preload of tension spring 65. Crescent ring 73 together with the screw head 71 secures the screw to the gage head body 15. An O-ring seal 75 positioned beneath the screw head 71 provides a seal between the interior of the gage head body and the exterior environment.

Another O-ring seal 77 surrounds the mounting post 25 about the pivot point E. O-ring 77 is seated in an annular groove 79 machined on the exterior of the mounting post. Due to the small displacement of the mounting post at the seal 77 resulting from the close proximity of the seal to the rotation center E, an O-ring seal is sufficient to provide adequate sealing together with the boot seal 81 at the exterior of the gage body surrounding the mounting post 25. Sealing of the mounting post relative to the gage body is made simple by virtue of the pivot point E location close to the side wall 35 of the gage head body as opposed to locating the rotation center a distance from the side wall. This reduces the angular displacement of the mounting post passing through the side wall, simplifying the sealing. This enables an O-ring to be used as the seal Boot seal 81 is held in place by the boot retainer 83 which is in turn, secured to the gage body by screws 85 and 87.

An electronic pencil probe 89 extends through the body side wall 35 with the probe head 91 engaging the bellcrank sensing arm 63 to sense the position of floating bar 61. The pencil probe includes a linear variable differential transformer to produce a variable electronic output signal depending upon the linear position of the probe tip 91. The pencil probe is secured to the side wall by a plate 93 secured by screws 95. O-ring seal 97 surrounds the pencil probe at the exterior of the gage head body and is held in place by seal block 99.

A cover 101 is secured to the gage head body 15 by a number of screws 103 forming a sealed interior compartment within the gage body. (See FIG. 2) The environment in which the gage operates adjacent a grinding wheel (not shown), includes large amounts of liquid coolant and metal debris from the grinding operation which must be kept from the interior of the gage head. If desired, the interior of the gage head can be slightly pressurized with air to ensure that if any leakage occurs, it will be from the inside out. The pressurized air can also be maintained at a given relative humidity to avoid any adverse effects on the transformer caused by changes in humidity. The gage head can be pressurized through a connection (not shown) which replaces screw 115.

Each side of the bellcrank 29 has three recesses 117 into which polymer pucks 119 are seated. There is a very small clearance between the pucks and the gage head body 15 or cover 101 such that the pucks maintain the alignment of the bellcrank within the gage head. The location of the pucks relative to one another, forming a triangle, resists rotation of the bellcrank out of the plane of the gage head. This prevents damage to the beams 31 and 33 in the event the active feeler 23 receives a side impact load.

The linkage system of the gage provides for motion in two dimensions enabling the gage to be relatively thin so as to fit within a narrow envelope necessary for gaging a crank pin journal of a crank shaft. The four bar linkage system also provides for pivotal motion of the bellcrank without the use of a pivot shaft and preloaded anti-friction bearings reducing the thickness of the gage.

The schematic view of FIG. 3 illustrates the range of motion of the four bar linkage. It is important to note that the full range of motion is never realized during the normal gaging process. Typically, a grinding operation will open the linkage only slightly beyond the solid line position. To illustrate gage operation, the full range will be described. As a surface of workpiece 13 is ground down, the active feeler 23 will move toward the fixed feeler 17 from broken line position 23b to position 23 shown in solid lines. As this occurs, the pivot bar 57 will rotate about pivot point A such that the pivot point B moves from its position at $B_2$ to the solid line position B. Pivot bar 59 will rotate about pivot point C such that the pivot point D will move from its position at $D_2$ to the solid line position D. As this occurs, the floating bar 61 will move from the broken line position 61b to the solid line position. The maximum amount of rotation of the pivot bar 61 in this direction, shown by position 61a, occurs when the sensing layer arm 29 contacts the body side wall at stop 109 preventing further movement of the floating bar. This corresponds to the position 23a of the active feeler and a positions $B_1$ and $D_1$ of pivot point B and D as shown in FIG. 3.

The active feeler 23 can be moved away from the fixed feeler 17 to the expanded position shown as 23b. In this position the pivot point B has moved to point $B_2$ and the pivot point D has moved to point $D_2$. The maximum extent of rotation in this direction is reached when the stop arm 111 of the bellcrank 29 contacts the gage body at 113.

The four bar linkage system allows the lever arms 63 and 111 of the bellcrank 29 to be relatively large in cross section so as to be able to withstand relatively high loads at the contact points 109 and 113 resulting in a increased durability to the gage. The location of the stops 109 and 113 is such that the cantilever beams 31 and 33 are not excessively stressed at the fulcra 51 thereby avoiding permanent damage to the beams.

The movement of the members of the four bar linkage system are all in a two dimensional plane such that the third dimension, the thickness dimension of the gage shown in FIG. 2, can be minimized resulting in a gage having a small thickness enabling it to be used in narrow spaces. The nature of the gage with a four bar linkage system enables the various moveable elements of the gage, the pivot bars 57 and 59 and floating bar 61 to be relatively spaced from one another such that each element can be physically removed from one another so that the maximum size and durability can be built into each component.

The use of cantilever beams 31 and 33 to support the bellcrank each having two fulcra to provide the pivot points for the four bar linkage system results in a rigid structure avoiding translation of the bellcrank. Beam 31 prevents movement of the bellcrank toward or away from side 105 of the gage body while beam 33 prevents movement of bellcrank toward or away from side 107 of the gage body. This results in a pivot system providing precise rotation with virtually zero back lash. The result of the four bar linkage system is a very thin gage while also maintaining the precision necessary for in-process gaging of a precision grinding operation.

It is to be understood that the invention is not limited to the exact construction illustrated and described above, but that various changes and modifications may be made without departing from the spirit and scope of the invention as defined in the following claims.

I claim:

1. A gage for monitoring a workpiece dimension during a machining operation, comprising:
   a casing defining an internal cavity and a portion of said casing defining a passage between said internal cavity and the exterior of said casing;
   a fixed feeler mounted to said casing and extending therefrom for contact with a workpiece surface;
   a four bar linkage system within said cavity;
   an active feeler rigidly mounted to said four bar linkage system through said passage whereby the position of said four bar linkage system corresponds to the position of said active feeler, said active feeler extending for contact with said workpiece surface; and
   electronic position sensing means contacting said four bar linkage system for detecting the position of said four bar linkage system and producing a corresponding electrical signal.

2. The gage of claim 1 further comprising bias means coupled to said four bar linkage system for urging said active feeler into contact with said workpiece surface.

3. The gage of claim 2 wherein said four bar linkage system includes two pivot bars extending from said casing into said internal cavity and being pivotally coupled to said casing at fixed pivot points, each of said bars having terminal ends extending into said cavity with said terminal ends being spaced from one another, a floating bar coupled to said terminal ends and means forming floating pivot points between each of said pivot bars and said floating bar; and
   said active feeler being rigidly coupled to said floating bar and said electronic position sensing means contacting said floating bar for detecting the position of said four bar linkage system.

4. The gage of claim 3 wherein the floating bar has an instantaneous center of rotation positioned within said passage between said internal cavity and the exterior of said casing.

5. The gage of claim 4 wherein said floating bar has a first portion contained within said internal cavity and a second portion passing through said passage and extending exteriorly of said casing and said gage further comprising means for effecting a seal between said floating bar and said casing in said passage with said seal means surrounding said floating bar substantially at said instantaneous center of rotation.

6. The gage of claim 5 wherein said seal means includes an "O"-ring surrounding said floating bar.

7. The gage of claim 3 wherein said floating bar is in the form of a bellcrank having first and second lever arms extending from said instantaneous center of rotation with said first lever arm contacting said electronic position sensing means and said second lever arm extending through said passage to the exterior of said casing where said active feeler is coupled thereto.

8. The gage of claim 7 wherein said bias means is coupled to said first lever arm.

9. A gage for monitoring a workpiece dimension during a machining operation, comprising:
   a casing defining an internal cavity and defining a passage between said cavity and the exterior of said casing;
   a fixed feeler mounted to said casing and extending therefrom for contact with a workpiece surface;
   a pair of cantilever beams each having a first end attached to said casing and each beam having a second end extending into said cavity;
   a floating bar coupled to said second ends of said beams;
   each beam having a pair of spaced fulcra between said first and second ends forming pivot points with a portion of each beam between said pivot points forming pivot bars of a four bar linkage;
   said floating bar having a first portion within aid cavity and a second portion extending through said passage to the exterior of said casing;
   an active feeler rigidly coupled to said second portion of said floating bar for contact with said workpiece surface whereby the position of said active feeler in relation to said fixed feeler is reflected by the position of said floating bar; and
   electronic position sensing means contacting said four bar linkage for detecting the position of said linkage and producing a corresponding electrical signal.

10. The gage of claim 9 further comprising bias means coupled to said four bar linkage for urging said active feeler into contact with said workpiece surface.

11. The gage of claim 9 wherein the floating bar has an instantaneous center of rotation positioned within said passage between said internal cavity and the exterior of said casing.

12. The gage of claim 11 further comprising means for effecting a seal between said floating bar and said casing in said passage with said seal means surrounding the second portion of said floating bar substantially at said instantaneous center of rotation.

13. The gage of claim 12 wherein said seal means includes an "O" ring encircling the floating bar.

14. The gage of claim 9 wherein said floating bar forms a bellcrank with said first portion forming a first lever arm contacting said electronic position sensing means and said second portion forming a second lever extending through said passage to the exterior of said casing.

15. The gage of claim 9 wherein said pivot bars are nominally oriented at approximately a right angle to one another with the instantaneous center of rotation of said floating bar substantially on the centerline of said passage between said internal cavity and the exterior of said casing.

16. A gage for monitoring a workpiece dimension during a machining operation, comprising:
   a casing defining an internal cavity and a passage between said cavity and the exterior of said casing;
   a fixed feeler mounted to said casing and extending therefrom for contact with a workpiece surface;
   a four bar linkage including a pair of pivot bars each having first and second ends with said first ends pivotally connected to said casing and a floating bar pivotally connected to said second ends with the axis of each pivot being substantially parallel with one another whereby said casing serves as a ground link for said four bar linkage;

an active feeler rigidly coupled to said floating bar for contact with said workpiece surface whereby the position of said active feeler in relation to said fixed feeler is reflected by the position of said floating bar; and electronic position sensing means contacting said floating bar for detecting the position of said floating bar and producing a corresponding electronic signal.

17. The gage of claim 16 wherein said floating bar has an instantaneous center of rotation disposed in said passage from said internal cavity to the exterior of said casing.

18. The gage of claim 16 wherein said four bar linkage has a nominal position without load applied to said linkage in which said pivot bars are normal to one another.

19. The gage of claim 16 wherein said floating bar is a bellcrank having first and second lever arms to which loads are applied to rotate said floating bar, said second lever arm extending through said passage to the exterior of said casing where said active feeler is mounted thereto.

20. The gage of claim 19 further comprising bias means coupled to said first lever arm to urge said bellcrank in a direction to move said active feeler toward said workpiece surface.

21. The gage of claim 19 wherein said electronic position sensing means contacts said first lever arm.

22. The gage of claim 19 wherein said first lever arm contacts a portion of said casing upon rotation of said bellcrank in one direction to limit further rotation of said bellcrank in said one direction.

23. The gage of claim 22 wherein said bellcrank has a third lever arm engageable with a portion of said casing upon rotation of said bellcrank in an opposite direction to limit further rotation of said bellcrank in said opposite direction.

24. The gage of claim 16 wherein said electronic position sensing means includes a linear variable differential transformer.

25. The gage of claim 16 wherein said pivot bars are formed by a pair of cantilever beams having two ends with one end of each beam rigidly mounted to said casing with the other end of said beams extending in said cavity and being rigidly mounted to said floating bar, each beam having two spaced fulcra defining pivot points with the portion of said beams between said fulcra forming said pivot bars.

* * * * *